Nov. 11, 1941.  R. F. LIST  2,262,616
SEWING MACHINE SPEED CONTROL
Filed June 13, 1940  2 Sheets-Sheet 2
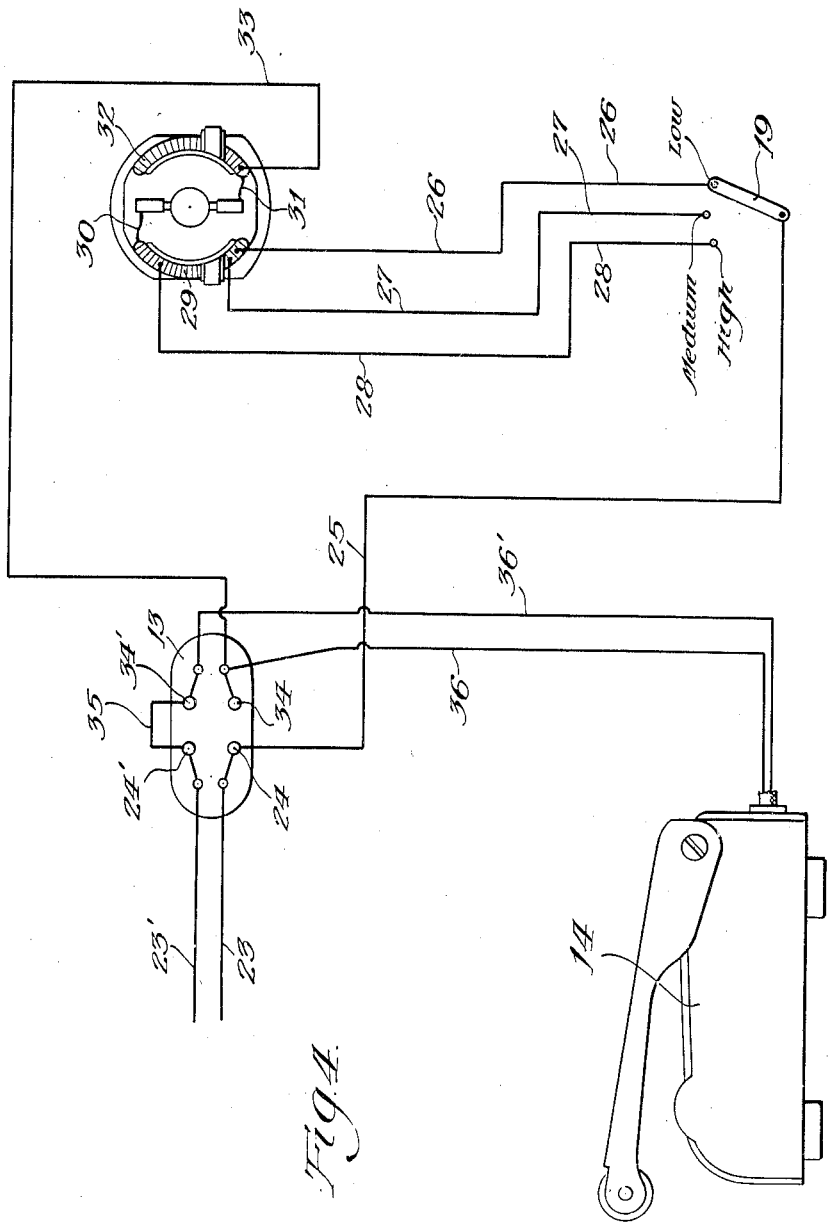

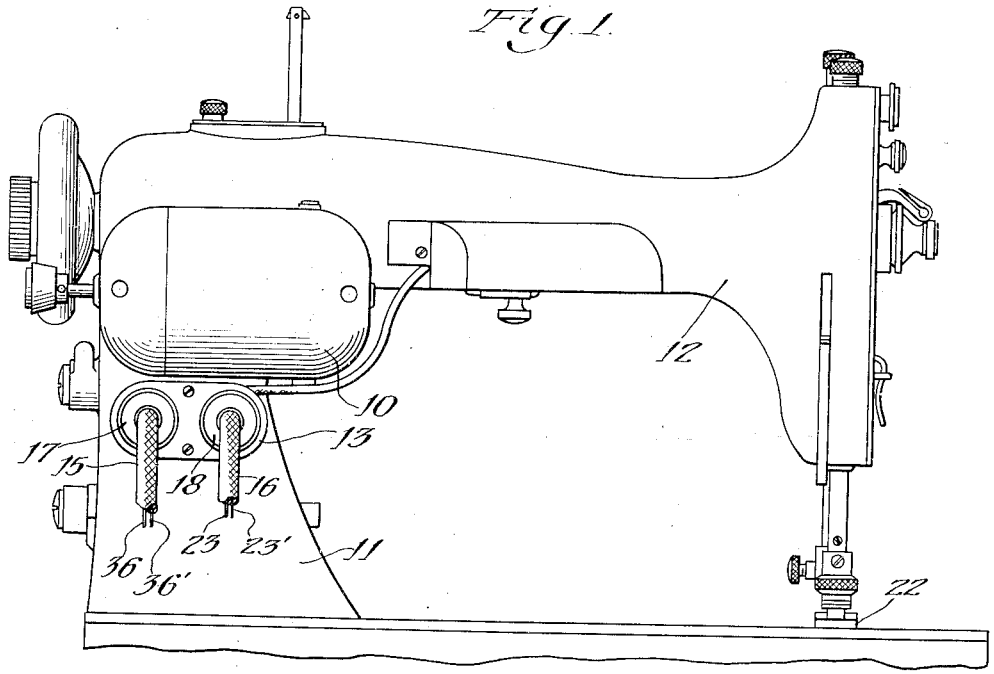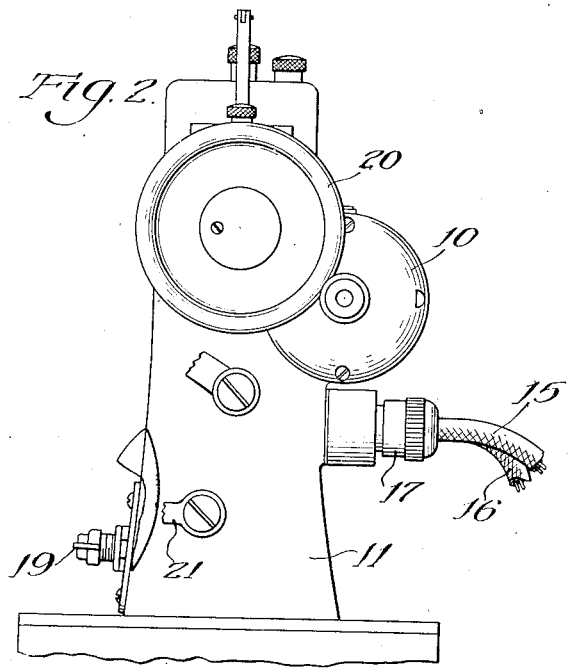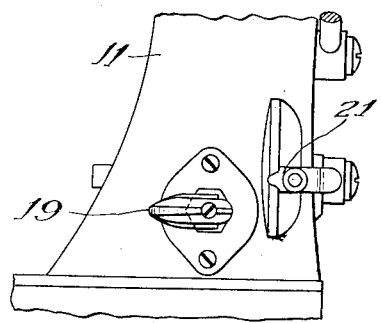

Patented Nov. 11, 1941

2,262,616

UNITED STATES PATENT OFFICE 2,262,616

SEWING MACHINE SPEED CONTROL

Raymond F. List, Belvidere, Ill., assignor to National Sewing Machine Company, Belvidere, Ill., a corporation of Illinois Application June 13, 1940, Serial No. 340,251

1 Claim. (Cl. 112—220)

This invention relates to motor driven sewing machines, and particularly to speed controlling means for such sewing machines.

The speed of sewing machine motors has been controlled heretofore by means of foot or knee operated regulators of the rheostat type, such as are shown in Patents Nos. 1,644,820 and 1,772,361, which operate to vary the speed within the entire range of speeds or capacity of the motor. The speed controlling means of my invention is adapted for embodiment in sewing machines provided with such previously known pressure operated regulators, as well as in sewing machines having no other speed regulating means.

The main object of my invention is to provide speed controlling means within easy reach of the operator's hand, for limiting the motor speed successively to a plurality of ranges of speeds within the motor capacity. For example, if the maximum motor speed is 1200 R. P. M., the controlling means herein shown may be made to confine the speed to a number of different ranges of speed, such as from zero to approximately 400 R. P. M., from 400 to 800 R. P. M., and from 800 to 1200 R. P. M. Thus the operator who desires to have the machine sew slowly may set the controlling means for low speed and thereupon the use of the pressure operated rheostat type regulator will confine the speed to approximately 400 R. P. M. or less, according to the degree of pressure exerted on the regulator. To increase the speed beyond the "low" range, the operator may set the controlling means of my invention for medium or high speed, whereupon the motor speed will be graduated by the pressure operated regulator within the selected range of speeds.

In the drawings:

Fig. 1 is a rear elevational view of a sewing machine head embodying my invention.

Fig. 2 is an end view of the same.

Fig. 3 is a front elevational view of a part of the head.

Fig. 4 is a diagrammatic view of the electrical circuit of my invention in combination with a rheostat type of regulator.

In that embodiment of the invention shown in the drawings, the motor 10 is mounted on the rear of the standard 11 and arm 12, and a junction block 13 is located below the motor on the standard 11. The leads to and from a foot operated regulator 14 are enclosed in a sheath 15 and the current supply wires are enclosed in a sheath 16 connected, respectively, to plugs 17 and 18 in said block 13.

Preferably located on the front wall of the standard 11 is a three-position switch 19 for manual control by the operator for selecting the speed range within which the motor is to operate. Other parts of the sewing machine include the fly wheel 20, stitch regulating and reversing device 21 and presser foot 22, which do not require special description.

Referring to Fig. 4, the motor circuit includes the supply lines 23, 23' connected by the plug 18 to the terminals 24, 24' in block 13, the line 25, switch 19, the parallel lines 26, 27, 28 tapped into the motor field coil 29, the brush leads 30, 31, field 32, line 33, terminals 34, 34', and connecting line 35 between the terminals 34' and 24'. The regulator 14 is connected in series in the motor circuit by the leads 36, 36' connected to the lines 33 and 23', through the terminals 34, 34' in block 13.

The tap 28 to the field 29 is so arranged that part of the number of field coil turns are cut out of the circuit and consequently the motor resistance is decreased and the speed of the motor is increased when the tap 28 is put into the circuit by means of the switch 19. The tap 27 is arranged so that a lesser number of field coil turns are cut out, motor resistance is decreased to a lesser degree and the speed of the motor is also less than when the tap 28 is in circuit. The tap 26 is arranged for producing the lowest range of motor speeds, by cutting out a minimum number of field coil turns and consequently retaining increased motor resistance.

The line 25, taps 26, 27 and 28, and line 33 are all located within the standard between the block 13, switch 19 and motor 10. The lines 23, 23' and 36, 36' are connected to the block 13 externally of the standard, by means of the plugs 18 and 17, respectively.

The control of the motor speed within a plurality of ranges of speed is a substantial aid to users of motor driven sewing machines, making them safer and easier to operate.

Changes may be made in details of construction without departing from the scope of my invention.

I claim:

In a sewing machine comprising a standard having a driving mechanism including an electric motor, a manually operable motor controller, and leads connecting said controller and motor to a source of current, means independent of said motor controller and mounted on said standard for varying the speed of said driving mechanism throughout the range of said controller, comprising a tapped field winding for said motor, and a switch mounted on said standard and selectively connected in series with the taps of said field winding and said controller.

RAYMOND F. LIST.